United States Patent [19]

Feterl

[11] Patent Number: 4,553,898
[45] Date of Patent: Nov. 19, 1985

[54] SWINGABLY MOUNTED TRUCK HOPPER

[75] Inventor: Leon G. Feterl, Salem, S. Dak.

[73] Assignee: Core Industries, Inc., Bloomfield Hills, Mich.

[21] Appl. No.: 541,876

[22] Filed: Oct. 14, 1983

[51] Int. Cl.⁴ .............................................. B65G 65/00
[52] U.S. Cl. .................................... 414/573; 198/535; 198/538; 198/861.4
[58] Field of Search ............... 414/353, 355, 356, 373, 414/378, 390, 573, 574; 198/657, 863, 865, 312, 535, 536, 538

[56] References Cited

U.S. PATENT DOCUMENTS

| | | | |
|---|---|---|---|
| 760,862 | 5/1904 | Guth | 414/356 |
| 1,785,249 | 12/1930 | Dailey | 198/865 X |
| 1,874,600 | 8/1932 | Ossing | 198/312 |
| 1,912,130 | 5/1933 | Eppensteiner | 198/863 |
| 2,144,360 | 1/1939 | Buckbee | 198/312 |
| 3,141,541 | 7/1964 | Mayrath | 198/865 |
| 4,082,181 | 4/1978 | Berthold et al. | 198/863 |

FOREIGN PATENT DOCUMENTS 683091 3/1964 Canada ................................ 414/573
987845 8/1951 France ................................ 198/865

Primary Examiner—Joseph E. Valenza
Assistant Examiner—Ken Muncy
Attorney, Agent, or Firm—Williamson, Bains, Moore & Hansen

[57] ABSTRACT

An apparatus for collecting and transporting particulate material from directly underneath the discharge outlet of a vehicle includes a collection chamber for receiving the particulate material. An auger is provided to convey particulate material from the collection chamber to an auger chamber for subsequent discharge of the particulate material into a receiving hopper. An extension mechanism is provided which permits telescopic extension of the collection chamber and auger chamber so that the collection chamber may be placed directly underneath the discharge outlet of the vehicle. A vertical positioning mechanism is also provided which allows the collection chamber to be raised from a lowered position to closely abut the discharge outlet of the vehicle. A swivel base mount is further provided so that the collection chamber and auger chamber may be selectively rotated between a position generally parallel to the vehicle and a collecting position under the vehicle.

12 Claims, 7 Drawing Figures

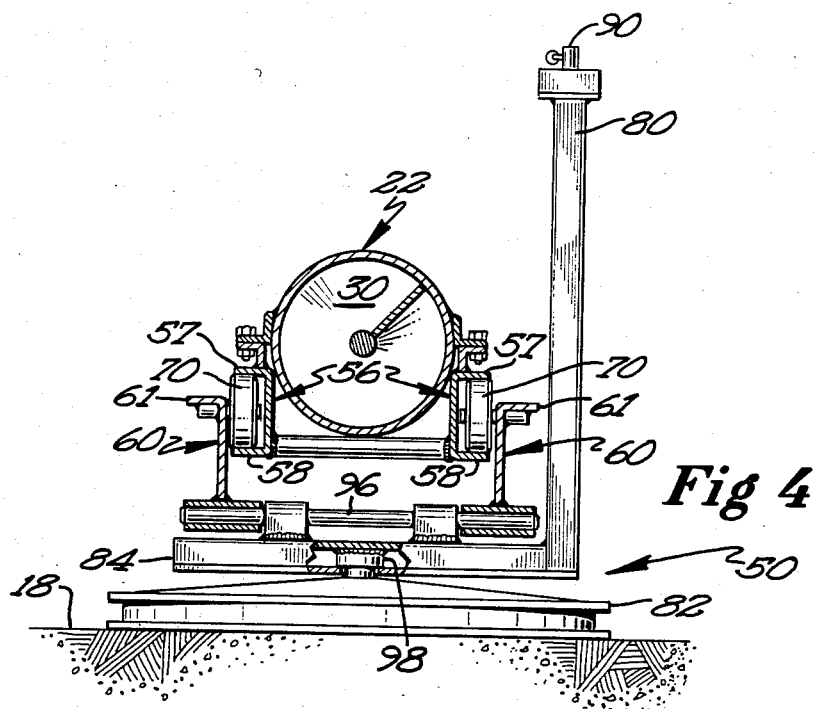
Fig 4
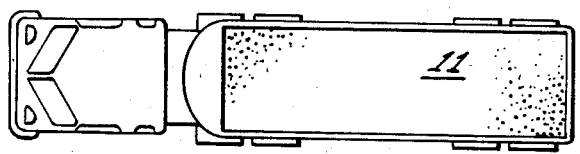
Fig 5
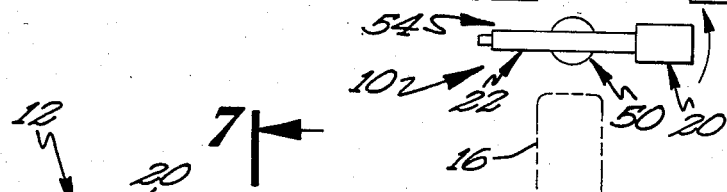
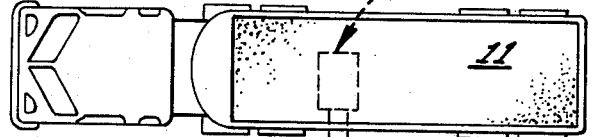
Fig 6
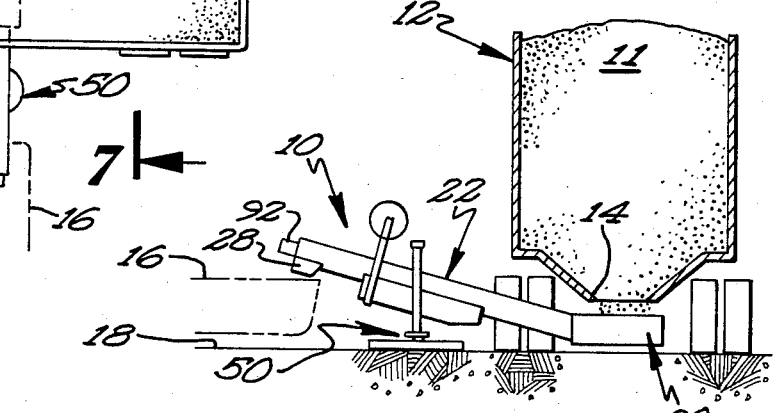
Fig 7

SWINGABLY MOUNTED TRUCK HOPPER

BACKGROUND OF THE INVENTION

The invention relates broadly to agricultural implements such as collection hoppers and the like. More particularly, the present invention comprises a swingably mounted truck hopper assembly for use in collecting and transporting particulate material, such as feeds, roughage, grains or the like, which is capable of receiving the particulate material from directly underneath the discharge outlet of the vehicle.

Hoppers are generally used to receive rough particulate material which is to be distributed through augers or other conveying machinery to a predetermined location. Most hoppers are comprised of a plurality of sidewalls and a lower, rigid oblique internal surface which cooperate to provide a feed or product receptive enclosure. An auger or other conventional conveying apparatus may be associated with the hopper to convey the contents to a desired position. For example, augers may be conveniently used to convey grain or corn to an upper storage bin.

In recent years, semitrailer trucks and railroads have accounted for a large part of the transportation means for agricultural products. Typically, a semitrailer or railroad car has an outlet for discharging agricultural products along its bottom. It is desirable, therefore, that a hopper be made which can be positioned directly under the discharge opening of the vehicle so that the agricultural products or grain will fall directly into the collection chamber of the hopper.

During the unloading process, the distance between a conveyor and successive railroad cars or semitrailers is variable. It is extremely time consuming to have to physically move a hopper to the unloading position of the semitrailer or railroad car for each successive unloading operation. It is, therefore, also desirable that a hopper for collecting and transporting particulate materials be capable of extending or retracting directly underneath the discharge opening of each successive semitrailer or railroad car which the hopper services.

The distance between the ground level and the discharge opening of the semitrailer or railroad car is also variable depending on the make and type of transportation means. Prior hoppers have not been able to be positioned in close alignment with the discharge opening of the semitrailers or railroad cars, as prior hoppers had their collection chambers at a constant height from or at ground level. This causes loss of a portion of the particulate material which falls from the discharge opening into the collection chamber of the hopper assembly. It is, therefore, further desirable that an apparatus for collecting and transporting particulate material from a semitrailer or railroad car be capable of raising or lowering the collection chamber of the hopper so that the collection chamber is closely abutting the discharge opening of the semitrailer or railroad car thereby preventing loss of the particulate material during unloading operations.

In many applications, successive semitrailers or railroad cars are unloaded in one continuous operation. To unload the vehicles in as efficient a manner as possible, the hopper assembly should be capable of moving to an out-of-the-way position so that successive semitrailers and railroad cars may be easily moved into their unloading position without the necessity of moving the entire hopper assembly. It is, therefore, also desirable that a hopper for collecting and transporting particulate material from a semitrailer or railroad car provide for a swivel means which permits the hopper assembly to be placed in an out-of-the-way position when successive semitrailers or railroad cars are unloaded in one continuous operation.

The present invention is directed toward solving these problems and provides a workable and economical solution to them.

SUMMARY OF THE INVENTION

This invention is directed to a grain hopper for collecting and transporting particulate material, such as feeds, roughage, grains or the like, from directly underneath the discharge outlet of a vehicle, particularly semitrailers and railroad cars. The invention is particularly characterized by a collection chamber which closely abuts the discharge outlet of the vehicle to receive the particulate material contained within the vehicle. The collection chamber contains an auger arrangement for transporting the particulate material within the hopper assembly. An auger chamber is disposed adjacent the collection chamber and cooperates with the collection chamber to transport the particulate material within the hopper assembly. The auger chamber also contains an auger arrangement. The auger arrangements of the collection chamber and auger chamber cooperate to transport the particulate material from the collection chamber to a discharge chute located adjacent the outer end of the auger chamber. The discharge chute discharges the particulate material into another receiver hopper or the like for subsequent storage.

The invention also utilizes an extension means which is capable of telescopic extension between a first position, wherein the collection chamber and auger chamber can be retracted to a storage condition, and a second position, wherein the collection chamber may be extended directly underneath the discharge opening of the semitrailer or railroad car so that the particulate material may fall directly into the collection chamber. The extension means is provided with a plurality of horizontal channels disposed adjacent to and on opposite sides of the auger chamber in a generally parallel relationship to the auger chamber. The horizontal channels have upper and lower edges extending outwardly therefrom. The extension means also include a plurality of support brackets which are disposed generally parallel to the horizontal channels. The support brackets contain top and bottom flanges extending outwardly from the support brackets. A rack and pinion arrangement is employed to retract and extend the collection chamber directly underneath the discharge opening of the semitrailer or railroad car. A horizontal extension wheel or crank is employed which permits the pinion to traverse along the rack until the collection chamber has reached its desired position. The support brackets also include a plurality of guide wheels which are engaged thereto and are disposed within the upper and lower edges of the channel. The guide wheels cooperate with the channel to aid in positioning the collection chamber between its first and second positions.

The extension means also includes a plurality of vertical support posts disposed adjacent to and on opposite sides of the auger chamber. The vertical support posts contain a vertical channel. A chain for horizontal positioning of the collection chamber is disposed within one of the vertical channels. A horizontal extension crank is included for manual displacement of the collection chamber between its first and second positions. The horizontal positioning chain communicates between a dual sprocket arrangement wherein one of the sprockets cooperates to rotate a pinion so that the collection chamber and auger chamber may be maneuvered between the first and second positions.

The invention also utilizes a vertical positioning means which allows the collection chamber to be moved between a lower position, wherein the bottom of the collection chamber rests on the ground level, and an upper position, wherein the collection chamber closely abuts the discharge opening of the semitrailer or railroad car. In the upper position, loss of the particulate material is minimized as the flow of the particulate material will not spill over the collection chamber.

The vertical positioning means includes a turnbuckle with spinner which is engaged with a support bracket. As the turnbuckle with spinner is rotated in a clockwise or counterclockwise direction, the collection chamber and auger chamber may be moved between their lower and upper positions.

This invention also includes a swivel means which allows the collection chamber and auger chamber to be rotated between a use position, wherein said collection chamber is placed directly underneath the discharge outlet of the vehicle, and a rest position, wherein the collection and auger chamber are rotatably removed to an out-of-the-way position generally parallel to the semitrailer or railroad car. Thus, unloaded vehicles may be efficiently removed from their unloading position and loaded vehicles may be moved into the unloading position.

The swivel means also includes a swivel post positioned adjacent the auger chamber for manual positioning of the hopper assembly between its use and rest positions. The swivel post includes a swivel post base which is disposed adjacent to and positioned underneath the auger chamber. A support stand resting on the supporting surface is rotatably mounted to the swivel post base. The cooperation of the swivel post, swivel post base, and the support stand allow the user to manually swing the hopper assembly between its use and rest positions.

Other objects and advantages of the invention will become apparent from the following detailed description and from the appended drawings in which like numbers have been used to describe like parts of the several views.

BRIEF DESCRIPTION OF THE DRAWINGS

FIG. 1 is a side elevation view of an embodiment of ths swingably mounted truck hopper with parts thereof cutaway or showing different positions of use for clarity;

FIG. 2 is a sectional end view of the apparatus taken along line 2—2 of FIG. 1;

FIG. 3 is a sectional side view of a portion of the apparatus taken along line 3—3 of FIG. 2;

FIG. 4 is a sectional end view of the apparatus taken along line 4—4 of FIG. 1;

FIG. 5 is a top view of the apparatus swiveled to a rest position out-of-the-way of a vehicle;

FIG. 6 is a top view of the apparatus swiveled to a use position; and

FIG. 7 is a view of the apparatus in use taken along line 7—7 of FIG. 6.

DESCRIPTION OF PREFERRED EMBODIMENT

Referring now to FIG. 7, a hopper assembly 10 receives and collects particulate material 11 from directly underneath the discharge outlet 14 of a vehicle 12, such as a semitrailer or a railroad car. A semitrailer is shown in FIGS. 5-7. The receiving assembly 10 is adapted to be swingably mounted on the supporting surface 18. The hopper assembly 10 transports the particulate material 11 for discharge into a receiving hopper 16. The receiving hopper 16 includes an auger that further conveys the particulate material 11 to the top of a silo or other storage facility.

The hopper assembly 10, as shown in FIG. 1, includes a collection chamber 20, preferably in a horizontal configuration, which is adapted to be placed directly underneath the discharge outlet 14 of the vehicle 12. The collection chamber 20 is designed to be generally parallel to the supporting surface 18 and the discharge outlet 14 so that the collection chamber 20 will be in generally close alignment with the discharge outlet 14 for receiving the particulate material 11. A rotable auger having flites or blades 30 extends within the collection chamber 20 to initially receive and transport the particulate material 11 through the hopper assembly 10.

As shown in FIG. 1, an auger chamber 22 having inner end 24 and outer or discharge end 26 is disposed adjacent the collection chamber 20 along the hopper assembly 10 and is in angular displacement to the collection chamber 20. The auger chamber 22 contains an auger, also having flites or blades 30, to convey the particulate material 11 through the auger chamber 22. The continuous auger arrangement 30 within the collection chamber 20 and the auger chamber 22 transports the particulate material 11 through the hopper assembly 10 until the material 11 is discharged through the discharge chute 28 into the receiving hopper 16. The same or separate augers may be used in collection chamber 20 and auger chamber 22. The discharge chute 28 is located adjacent the outer end 26 of the auger chamber 22. The discharge chute 28 extends downwardly from the auger chamber 22 so that the material 11 may fall directly into the receiving hopper 16. The discharge chute 28 is attached to the auger chamber 22 by means of discharge chute bolts 29.

As best shown in FIGS. 1 and 2, the hopper assembly 10 also includes a horizontal extension crank 75 which can extend or retract the collect-on chamber 20 and auger chamber 22 between a first position 40 and a second position 42, as shown in phantom, and provides for an extension means for horizontal displacement of the hopper assembly 10. In the first position 40, the collection chamber 20 and auger chamber 22 are retracted away from the discharge outlet 14 of the vehicle 12. In the second position 42, as shown in phantom, the collection chamber 20 and auger chamber 22 may be placed directly underneath the discharge outlet 14 of the vehicle 12 so that the particulate material 11 may fall directly into collection chamber 20.

The device 10 also utilizes a plurality of vertical support posts 72 which are disposed adjacent to and on opposite sides of the auger chamber 22. As best shown in FIG. 2, the vertical support posts 72 have an inner face 77 and an outer face 78. The vertical support posts 72 include a vertical channel 74 along their entire inner face 77. A linkage chain 76 is located with the configuration of one of the vertical channel beams 74 and communicates between a lower sprocket 85 and an upper sprocket 86. The lower and upper sprockets 85 and 86 are also located within the configuration of the vertical channel 74. The horizontal extension wheel or crank 75 is in rotational engagement with the upper sprocket 86 so that the linkage chain 76 is driven by the horizontal extension crank 75 and in turn the lower sprocket 85 is rotated. A lock key 99 is provided to engage the linkage chain 76 so that the operator may lock the crank 75 and chain 76 so that the collection chamber 20 may be reliably retained in the desired extended or retracted position.

The extension or retraction of the hopper assembly 10 is accomplished by means of a rack and pinion arrangement. As best shown in FIGS. 1 and 2, a pair of horizontal channels 56 are disposed adjacent to and on opposite sides of the auger chamber 22. The horizontal channels 56 are in a generally parallel relationship to the auger chamber 22. The horizontal channels 56 are engaged to the auger chamber 22 by means of weld brackets and bolts 59 as shown. The channels 56 include an upper edge 57 and a lower edge 58 which extend outwardly therefrom. As shown in FIG. 3, a rack 66 having continuously spaced teeth is disposed along the lower edge 58. The rack 66 is preferably located along the entire length of the lower edge 58.

As illustrated in FIG. 2, a pinion 64 is located along a lower axle 87. The lower axle 87 is rotated by the rotation of the lower sprocket 85. Therefore, the rotation of the pinion 64 is also dependent on the rotation of the lower sprocket 85. Since the rotation of the lower sprocket 85 is dependent upon the rotation of the horizontal extension crank 75, as explained above, the rotation of the pinion 64 is also dependent on the rotation of the crank 75.

As shown in FIG. 3, the pinion 64 is in operational engagement with the rack 66 and traverses along the rack 66 when rotated by the horizontal extension crank 75 to extend or retract the collection chamber 20 and auger chamber 22 between their first and second positions, 40 and 42, respectively. This rack and pinion arrangement permits the collection chamber 20 to be placed directly underneath the discharge outlet 14 of the vehicle 12 to receive the particulate material 11.

The hopper assembly 10 also includes a plurality of support brackets 60 which are disposed adjacent to the horizontal channels 56 and on opposite sides of the auger chamber 22 in a generally parallel relationship to the auger chamber 22. The support brackets 60 include a top and bottom flange, 61 and 62, respectively, which extend outwardly from the brackets 60 away from the auger chamber 22. As shown in FIG. 2, the vertical support posts 72 are attached to the top and bottom flanges, 61 and 62, respectively, thereby maintaining and stabilizing the vertical support posts 72 in a vertical position. The brackets 60 also support a plurality of guide wheels 70 attached thereto adjacent the top flange 61. The guide wheels 70 are positioned between the upper and lower edges 57 and 58, respectively, of the horizontal channels 56. The upper and lower edges 57 and 58 closely confine and abut the guide wheels 70 while the guide wheels 70 rotate. The positioned engagement of the guide wheels 70 between the upper and lower edges 57 and 58 and the cooperation between the guide wheels 70 and the horizontal channels 56 provide stability to the hopper assembly 10 when retracting or extending the collection chamber 20 and auger chamber 22.

The hopper assembly 10 also includes a turnbuckle with spinner, generally denoted as 68, which is connected between a swivel post 80 and a brace 63 which is attached to one of the support brackets 60. The turnbuckle 68 changes the angle of the hopper assembly 10 so that the collection chamber 20 may be moved up and down to accommodate uneven terrain and varying distance from the horizontal pivot axis 96. The turnbuckle with spinner 68 when tightened or loosened along threaded arms 69 rotates the hopper assembly 10 about a horizontal pivot axis 96. The turnbuckle with spinner 68 provides for a vertical position means wherein the collection chamber 20 and the auger chamber 22 can be pivotally raised or lowered between a lower position, as shown in phantom, and an upper position, shown in solidlines in FIG. 1. In the lower position, the collection chamber 20 may be brought into contact with the supporting surface 18. When so pivoted, the discharge end 26 of auger chamber 22 will be elevated as shown in phantom and indicated by the directional arrow in FIG. 1. In the upper position, the collection chamber 20 may be vertically adjusted to closely abut the discharge outlet 14 of the vehicle 12 so that the particulate material 11 may fall directly into the collection chamber 20. Since the collection chamber 20 can be raised to the upper position closely abutting the discharge outlet 14, loss of the particulate material 11 exiting the vehicle 12 is minimized.

The cooperation between the horizontal extension crank 75 and the turnbuckle with spinner 68 permits the collection chamber 20 to be extended directly underneath the discharge outlet 16, while at the same time, the collection chamber 20 may be raised so that the collection chamber 20 closely abuts the discharge outlet 16. This process significantly reduces the amount of particulate material 11 which is not received by the collection chamber 20, such as overflow of the material 11.

Referring to FIG. 4, the embodiment 10 includes a swivel means 50 incorporating a swivel post base 82 which rests on the supporting surface or ground 18. A support stand 84 is rotatably mounted on the support post base 82. A swivel post 80 extends upwardly from the support stand 84. The swivel post 80 is, therefore, capable of rotating 180° about a swivel pivot point 98 on base 82. The swivel means 50 permits the collection chamber 20 and auger chamber 22 to be manually rotated between a use position 52, as shown in FIG. 6, wherein the collection chamber 20 may be placed directly underneath the discharge outlet 14 of the vehicle 12, and a rest position 54, as shown in FIG. 5, wherein the collection chamber 20 and auger chamber 22 are rotated about swivel pivot point 98 to an out of the way position which is generally parallel to the vehicle 12. In the rest position 54, an unloaded vehicle can efficiently and easily leave its unloading position and a loaded vehicle may move into the unloading position.

The auger 30 is preferably operated by electrical means. An auger motor 92 is positioned adjacent the outer end 26 of the auger chamber 22. A switch 90 is also positioned on the top of the swivel post 80 and an electrical cable 94 extends between the switch 90 and the auger motor 92. By means of the switch 90, auger motor 92 can be selectively operated. An hydraulic power source could also be used to drive the auger.

In operation, the hopper assembly 10 is initially rotated to the rest position 54, as shown in FIG. 5, so that a loaded vehicle 12 may be moved into the unloading position. Once the vehicle 12 is in the unloading position, the operator can rotate the hopper assembly 10 to its use position 52, as shown in FIG. 6, by manually exerting a force on swivel post 80 thereby rotating the hopper assembly 10 about pivot point 98 so that the hopper assembly 10 will be generally perpendicular to the vehicle 12.

To maneuver the hopper assembly 10 directly underneath the discharge outlet 14 of the vehicle 12, the operator rotates the horizontal extension crank 75 until the collection chamber 20 is aligned directly underneath the discharge outlet 14. While rotating the horizontal extension crank 75, the pinion 64 will traverse along the rack 66, as explained previously, until the first position 40 is reached. Once the collection chamber is aligned directly underneath the discharge outlet 14, the operator engages the lock pin 99 with the linkage chain 76 so that collection chamber 20 remains in the first position 40.

After the collection chamber 20 is generally aligned with the discharge outlet 14, the operator turns the turnbuckle with spinner 68 so that the hopper assembly 10 is rotatably raised and the collection chamber 20 can closely abut the discharge outlet 14 of the vehicle 12. The particulate material 11 within the vehicle 12 can now be exited through the discharge outlet 14.

The particulate material 11 exiting the vehicle 12 through the discharge outlet 14 is received by the collection chamber 20. The material 11 is transported through the collection chamber 20 by means of auger 30. The auger 30 subsequently transports the material 11 through the auger chamber 22 until the material 11 is discharged out of the hopper assembly 10 through discharge chute 28 into the receiving hopper 16. The receiving hopper 16 contains another auger (not shown) that further conveys the material 11 to the top of a silo or other storage facility.

After the vehicle 12 is unloaded, the operator turns the turnbuckle with spinner 68 so that the collection chamber 20 is lowered. The operator subsequently disengages the lock pin 99 from the linkage chain 76 and rotates the horizontal extension crank 75 so that the hopper assembly 10 is retracted from underneath the vehicle 12. The operator finally rotates the hopper assembly 10 to its rest position 54, as shown in FIG. 5, by applying a force to swivel post 80 allowing the hopper assembly 10 to rotate about swivel pivot point 98. The unloaded vehicle may now be moved from the unloading position and a new loaded vehicle may be moved into the unloading position and the above mentioned process may be repeated.

While the preferred embodiments of the present invention have been described, it should be understood that various changes, adaptations, and modifications may be made therein without departing from the spirit of the invention and scope of the appended claims.

What is claimed is:

1. Apparatus for collecting and transporting particulate material from a discharge outlet of a vehicle to receiving means, and adapted to be disposed on a supporting surface comprising:

a collection chamber for receiving particulate material from the vehicle with its configuration permitting it to be positioned directly under the discharge outlet of the vehicle for receiving the particulate material;

an elongated auger chamber having inner and outer ends and being angularly displaced from the supporting surface and including a discharge outlet adjacent said outer end, said inner end being adjacent to said collection chamber, and said discharge outlet being positioned so that the particulate material may discharge directly into the receiving means;

said collection chamber and said auger chamber having a rotatable auger supported and disposed therewithin to transport the particulate material from said collection chamber to said discharge outlet;

extension means for extension of said collection chamber lengthwise along the longitudinal axis of said auger chamber between a first position, wherein said collection chamber and said auger chamber are in a retracted storage condition, and a second position, wherein said collection chamber is extended for placement directly underneath the discharge outlet of the vehicle so that the particulate material may fall directly into said collection chamber; and vertical positioning means for pivotally positioning said collection chamber about a horizontal axis between a lower position, wherein said collection chamber may be readily positioned under a vehicle discharge outlet, and an upper position, wherein said collection chamber is placed directly underneath and closely abutting the discharge outlet of the vehicle so that the particulate material may be received by said collection chamber with minimal loss; and a swivel means for rotating said collection chamber and said auger chamber about a generally vertical axis between a use portion, wherein said collection chamber is capable of being placed directly underneath the discharge outlet of the vehicle to receive the particulate material exiting the discharge outlet of the vehicle, and a rest position, wherein said collection chamber and said auger chamber are rotated to a position to the side of the vehicle so that the vehicle may depart its unloading position, said swivel means comprising a support stand disposed adjacent to and underneath said uager chamber and a base which rests on the supporting surface and is rotatably mounted to said support stand, said swivel base and said support stand cooperating to permit the rotating movement of said collection chamber and said auger chamber between said use and rest positions, and said extension means is disposed in cooperative association with said auger chamber and is operative to extend and retract said collection chamber lengthwise along the longitudinal axis of said auger chamber relative to said support stand.

2. The apparatus for collecting and transporting particulate material of claim 1 wherein:

said extension means includes a plurality of vertical support posts disposed adjacent to and on opposite sides of said auger chamber, at least one of said vertical support posts including a vertical channel, said vertical channel having an upper and a lower sprocket disposed thereon with a linkage chain connected between said upper and lower sprockets; and said extension means also includes crank means disposed adjacent one of said vertical support posts and connected with one of said sprockets, said crank driving said linkage chain so that both sprockets rotate.

3. The apparatus for collecting and transporting particulate material of claim 2 wherein:
said extension means includes a pair of horizontal channels having upper and lower edges and disposed adjacent to and on opposite sides of said auger chamber in a generally parallel, affixed relation to said auger chamber, at least one of said bottom edges having a rack disposed along its length; and
a pinion which rotates in conjunction with and cooperates with one of said sprockets and is engaged with and traverses along said rack for moving said collection chamber and said auger chamber between said first and second positions.

4. The apparatus for collecting and transporting particulate material of claim 3 wherein:
said extension means further includes a pair of elongated support brackets having a plurality of guide wheels rotatably attached thereto, said guide wheels being disposed lengthwise along opposite sides of said auger chamber between said upper and lower edges of said channels and cooperating with said channels to rotatably support said auger chamber when moving said collection chamber and said auger chamber between said first and second positions.

5. The apparatus for collecting and transporting particulate material of claim 1 wherein:
said swivel means further comprises an upright post disposed adjacent to said auger chamber, and said vertical positioning means comprises an adjustable mechanical linkage extending between said upright post of said auger chamber, whereby manipulative adjustment of said mechanical linkage raises and lowers said collection chamber by pivotal movement thereof about said horizontal axis.

6. The apparatus for collecting and transporting particulate material of claim 5 wherein:
said adjustable mechanical linkage comprises a turnbuckle assembly operative to move said collection chamber between said lower and upper positions.

7. Apparatus for collecting and transporting particulate material from a discharge outlet of a vehicle to a receiving location and adapted to be disposed on a supporting surface comprising:
a collection chamber for receiving the particulate material from the vehicle with its configuration permitting it to be positioned directly underneath the discharge outlet of the vehicle for receiving the particulate material;
an auger chamber having inner and outer ends and being angularly displaced from the supporting surface and including a discharge outlet, said inner end being adjacent to said collection chamber and said discharge outlet being on said outer end;
rotatable auger means supported and disposed within said collection chamber and said auger chamber to transport particulate material from said collection chamber to said discharge outlet;
extension means for extension of said collection chamber generally along the longitudinal axis of said auger chamber between a first position, wherein said collection chamber and said auger chamber are in a storage condition, and a second, extended position, wherein said collection chamber may be placed directly underneath the discharge outlet of the vehicle so that the particulate material may fall directly into said collection chamber;
said extension means including a plurality of vertical support posts disposed adjacent to and on opposite sides of said auger chamber, at least one of said vertical support posts supporting upper and lower sprockets in vertically spaced relation thereon, with a linkage chain communicating between said upper and lower sprockets; and
said extension means also including an extension crank disposed adjacent one of said vertical support posts and communicating with said upper sprocket, said extension crank driving said linkage chain so that the lower sprocket rotates;
said extension means further including a pair of horizontal channels having upper and lower edges and disposed adjacent to and on opposite sides of said auger chamber in a generally parallel relation to said auger chamber, at least one of said bottom edges having a rack disposed along its length; and
a pinion which rotates in conjunction with and cooperates with said lower sprocket and is engaged with and traverses along said rack to move said collection chamber and said auger chamber between said first and second positions.

8. The apparatus for collecting and transporting particulate material of claim 7 and further including:
a vertical positioning means for adjustably positioning said collection chamber between a lower position, and an upper position, wherein said collection chamber is placed directly underneath and closely abutting the discharge outlet of the vehicle so that the particulate material may be received by said collection chamber with minimal loss.

9. The apparatus for collecting and transporting particulate material of claim 8 wherein:
said vertical positioning means includes a turnbuckle with spinner which may be operated to move said collection chamber between said lower and upper positions.

10. The apparatus for collecting and transporting particulate material of claim 7 and further including:
a swivel means for rotating said collection chamber and said auger chamber in a generally horizontal plane between a use position, wherein said collection chamber is capable of being placed directly underneath the discharge outlet of the vehicle to receive the particulate material exiting the discharge outlet of the vehicle, and a rest position, wherein said collection chamber and said auger chamber are rotated to a position generally parallel to the vehicle so that the vehicle may depart its unloading position.

11. The apparatus for collecting and transporting particulate material of claim 10 wherein:
said swivel means includes a swivel post disposed adjacent said auger chamber, said swivel post including a support stand disposed adjacent to and underneath said auger chamber, said swivel means also includes a base which rests on the supporting surface and is rotatably mounted to said support stand, said swivel post, said base and said support stand cooperating to permit the movement of said collection chamber and said auger chamber between said use and rest positions.

12. The apparatus for collecting and transporting particulate material of claim 7 wherein:
said extension means further includes a pair of elongated support brackets having a plurality of guide wheels rotatably attached thereto, said guide wheels being disposed lengthwise along opposite sides of said auger chamber between said upper and lower edges of said channels and cooperating with said channels to rotatably support said auger chamber when moving said collection chamber and said auger chamber between said first and second positions.

* * * * *